US009228609B2

(12) United States Patent
Steinmetz et al.

(10) Patent No.: US 9,228,609 B2
(45) Date of Patent: Jan. 5, 2016

(54) LASER CLADDING FABRICATION METHOD

(71) Applicant: Caterpillar Inc., Peoria, IL (US)

(72) Inventors: Andrew Douglas Steinmetz, Peoria, IL (US); Daniel Joseph Sordelet, Peoria, IL (US); Douglas Trent Weaver, Metamora, IL (US); Thierry A. Marchione, Edgewood, NM (US)

(73) Assignee: Caterpillar Inc., Peoria, IL (US)

( * ) Notice: Subject to any disclaimer, the term of this patent is extended or adjusted under 35 U.S.C. 154(b) by 109 days.

(21) Appl. No.: 13/968,686

(22) Filed: Aug. 16, 2013

(65) Prior Publication Data
US 2015/0047201 A1  Feb. 19, 2015

(51) Int. Cl.
*B23K 26/00* (2014.01)
*F16C 33/14* (2006.01)
*B23K 26/10* (2006.01)
*B23K 26/06* (2014.01)
*B23K 26/34* (2014.01)

(52) U.S. Cl.
CPC .............. *F16C 33/14* (2013.01); *B23K 26/0608* (2013.01); *B23K 26/10* (2013.01); *B23K 26/34* (2013.01)

(58) Field of Classification Search
USPC ............... 219/121.15, 121.16, 121.17, 121.6, 219/121.73, 121.74, 121.76, 76.1
See application file for complete search history.

(56) References Cited

U.S. PATENT DOCUMENTS

| 3,952,180 | A | 4/1976 | Gnanamuthu |
| 4,826,736 | A | 5/1989 | Nakamura |
| 5,889,254 | A | 3/1999 | Jones |
| 6,089,683 | A | 7/2000 | Anderton et al. |
| 6,145,941 | A | 11/2000 | Anderton et al. |
| 7,345,255 | B2 | 3/2008 | Jiang et al. |
| 7,595,239 | B2 | 9/2009 | Om |
| 2002/0080845 | A1 | 6/2002 | Schulz et al. |
| 2007/0221638 | A1* | 9/2007 | Yoshikawa et al. ...... 219/121.63 |
| 2009/0095214 | A1 | 4/2009 | Whitfield |
| 2010/0086702 | A1 | 4/2010 | Blankenship et al. |
| 2011/0253680 | A1* | 10/2011 | Clark et al. .................. 219/76.1 |

FOREIGN PATENT DOCUMENTS

EP        2295189       3/2011

* cited by examiner

*Primary Examiner* — Brian Jennison
(74) *Attorney, Agent, or Firm* — Finnegan, Henderson, Farabow, Garrett & Dunner, LLP

(57) ABSTRACT

A fabrication method is provided for use in making a component. The fabrication method may include generating a laser beam at a first orientation relative to a wear surface of the component to produce a first laser beam spot having a first characteristic, and feeding a cladding material into the first laser beam spot to produce a cladding layer on the wear surface. The fabrication method may also include generating a laser beam at a second orientation relative to the wear surface of the component to produce a second laser beam spot having a second characteristic, and moving the second laser beam spot along the cladding layer to substantially flatten the cladding layer.

17 Claims, 5 Drawing Sheets

LASER CLADDING FABRICATION METHOD

TECHNICAL FIELD

The present disclosure is directed to a fabrication method and, more particularly, to a fabrication method using laser cladding.

BACKGROUND

Many engine and machine components experience abrasive conditions, which can cause accelerated wear of the components. When this wear occurs at a seal interface, fluids can leak through the worn areas. Accordingly, some components are fabricated with a wear surface having enhanced material properties at the seal interface. An exemplary machine component having such a wear surface is a track bushing that forms a portion of a machine's undercarriage.

An exemplary track bushing is described in U.S. Pat. No. 6,089,683 that issued to Anderton et al. on Jul. 18, 2000 ("the '683 patent"). The track bushing of the '683 patent has a tubular shape, with bearing surfaces located at opposing ends thereof. A circumferential groove is formed within each bearing surface and filled with an abrasion-resistant material. The material is deposited within the grooves and bonded to a base material of the tubular shape by way of laser cladding. Excess material protruding from the grooves after deposition is removed through a grinding process.

Although the laser cladding process of the '683 patent may be adequate for most applications, it may still be less than optimal, in particular, the material removed through the grinding process may be wasted. And waste increases a cost of the track bushing, in addition, the amount of grinding that occurs in some applications may be significant, causing premature wear of the associated grinding equipment.

An alternative laser cladding process is described in U.S. Pat. No. 3,952,180 that issued to Gnanamuthu on Apr. 20, 1976 ("the '180 patent"). Specifically, the '180 patent describes a laser cladding process wherein multiple adjacent and smaller rows of material are deposited on a metal substrate. The resulting wavy clad surface is then smoothed by locally oscillating the laser beam over the surface during the course of subsequent laser scanning passes.

While the laser cladding process of the '180 patent may result in a smooth clad surface with less waste, it may be a complicated process that is difficult to control. In particular, the laser and/or the component must be oscillated in a precise pattern, while also scanning the laser beam across the clad surface of the component. This type of control can be expensive and prone to error.

The fabrication method of the present disclosure is directed at solving one or more of the problems set forth above and/or other problems in the art.

SUMMARY

In one aspect, the disclosure is related to a method of fabricating a component. The method may include generating a laser beam at a first orientation relative to a wear surface of the component to produce a first laser beam spot having a first characteristic, and feeding a cladding material into the first laser beam spot to produce a cladding layer on the wear surface. The fabrication method may also include generating a laser beam at a second orientation relative to the wear surface of the component to produce a second laser beam spot having a second characteristic, and moving the second laser beam spot along the cladding layer to substantially flatten the cladding layer.

In another aspect, the disclosure is related to a laser cladding system. The laser cladding system may include a fixture configured to hold a component, and a material feeder configured to direct a cladding material toward a wear surface of the component when the component is held in the fixture. The laser cladding system may also include a laser configured to direct a laser beam onto the wear surface of the component when the component is held in the fixture, and a controller in communication with the laser and the material feeder. The controller may be configured to generate a laser beam at a first orientation to produce a first laser beam spot having a first characteristic, and to cause the material feeder to direct the cladding material into the first laser beam spot to produce a cladding layer on the wear surface. The controller may be further configured to generate a laser beam at a second orientation to produce a second laser beam spot having a second characteristic, and to move the second laser beam spot along the cladding layer to substantially flatten the cladding layer.

DETAILED DESCRIPTION

Figure 1:
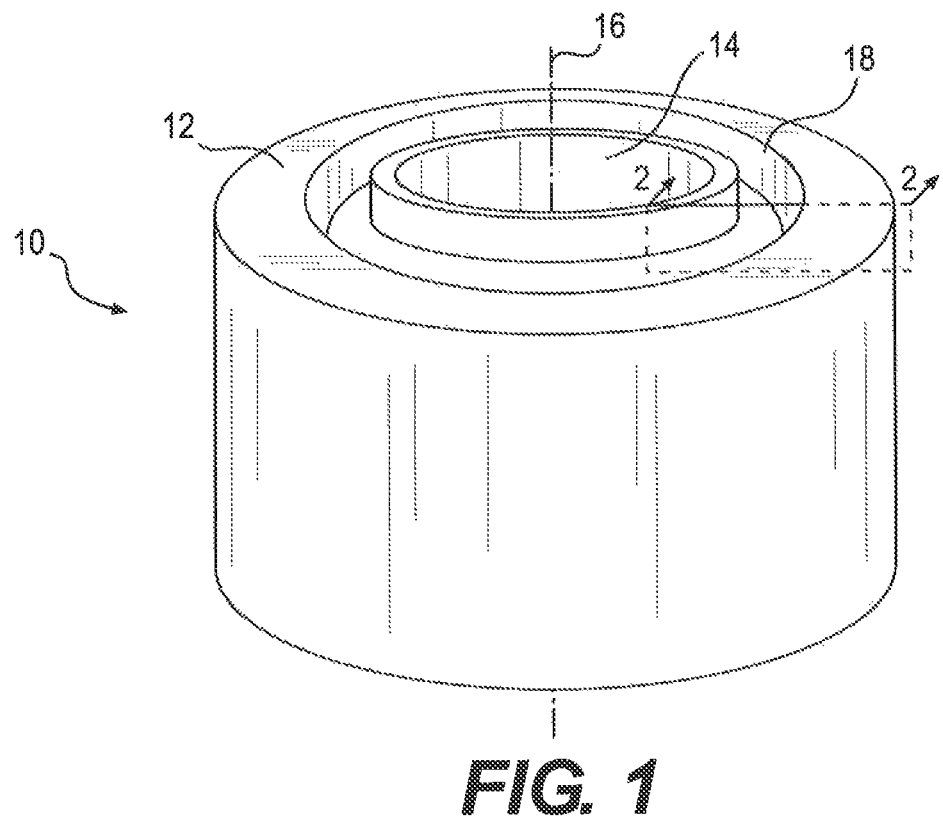
FIG. 1 is an isometric illustration of an exemplary grooved component.

FIG. 1 illustrates an exemplary component 10 having a wear surface 12. In the disclosed embodiment, component 10 is a cylindrical bushing with a central bore 14 that is configured to receive a rotating shaft (not shown). And wear surface 12 is configured to surround the rotating shaft and provide a face against which a seal (e.g., a lip seal not shown) may press. The seal may rotate with the shaft, and function to maintain a lubricant within the bushing. In order for the seal to function properly, wear surface 12 should be relatively smooth and planar (i.e., generally perpendicular to an axis 16 of central bore 14), and have high resistance to abrasive wear. In one exemplary application, a base material of component 10 is surface hardened, for example through heat treating, to about 50 HRC.

In some applications, a greater abrasion resistance may be required at wear surface 12 than can be provided by the base material of component 10. Accordingly, in these applications, a circumferential groove 18 may be formed within wear surface 12 at the intended seal engagement location, and groove 18 may be filled with a cladding material having improved wear characteristics. This cladding material may include, for example, a ferrous metal, nickel, cobalt, chromium, or an alloy thereof. For example, the cladding material may include a steel, such as a martensitic steel having a hardness of about 60 HRC.

Figure 2:
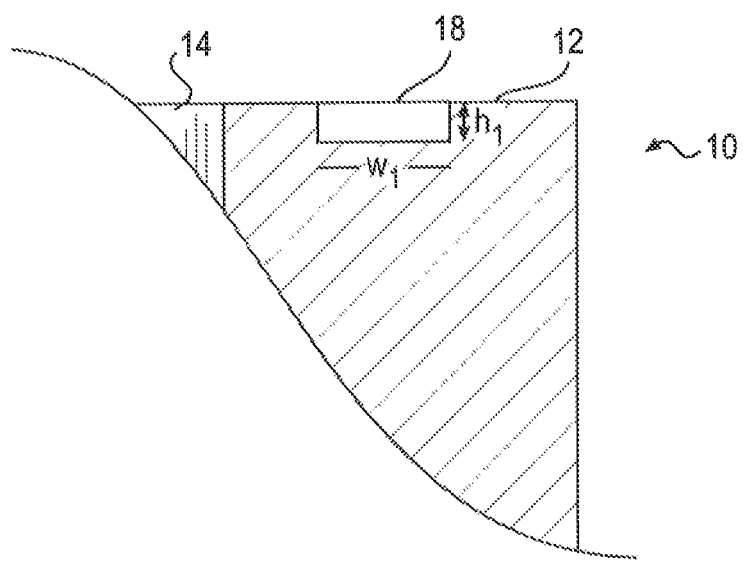
FIG. 2 is a cross-sectional illustration of an exemplary portion of the grooved component of FIG. 1.

Although groove 18 is shown in FIG. 2 as having a generally square cross-section (i.e., as being formed with a square end mill), it is contemplated that groove 18 may have another shape (e.g., spherical, dove-tailed, chamfered, etc.), if desired. In the disclosed embodiment, a height $h_1$ of groove 18 is about 10-15% of a width $w_1$. For example, height $h_1$ may be about 1 mm and width $w_1$ may be about 8 mm. This relationship may provide adequate surface area for the lip seal to ride against, while also helping to ensure a depth necessary for adequate strength. It is possible, however, for other relationships to be used. Groove 18 may be located at any radial location within wear surface 12.

Figure 3:
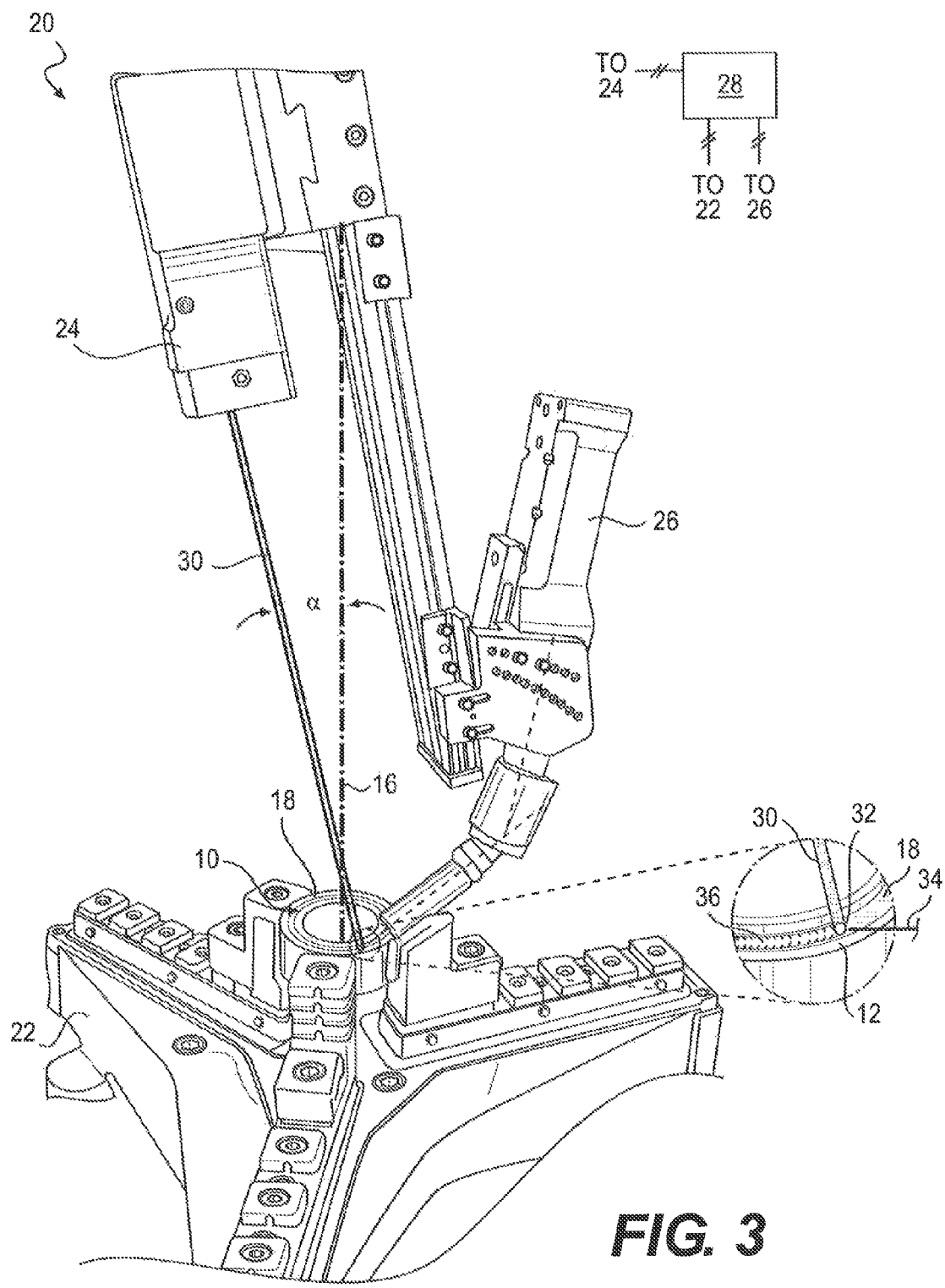
FIGS. 3 and 4 are isometric illustrations of an exemplary disclosed fabrication system used to make the grooved component of FIG. 1.

It is contemplated that component 10 may have groove 18 formed therein as an original feature during manufacturing or, alternatively, groove 18 may be formed during remanufacturing of component 10 at an end of a first useful life. That is, it may be possible that groove 18 is formed only after a period of use of component 10, for example after wear surface 12 has already been abraded to some degree. In this way, the useful life of component 10 may be extended and/or component 10 may be repurposed through the formation and filling of groove 18. In either situation, groove 18 may be filled with the abrasion-resistant cladding material by a laser cladding system (LCS) 20, an example of which is shown in FIG. 3.

LCS 20 may be an assembly of parts that cooperate to fill groove 18 after its formation. These components may include, among other things, a fixture 22, a laser 24, a material feeder 26, and a controller 28. Fixture 22 may be configured to hold and/or move component 10 relative to the other parts of LCS 20. Laser 24 may be configured to generate a laser beam 30 directable onto wear surface 12 (e.g., into groove 18). Material feeder 26 may be configured to feed the abrasion-resistant cladding material into a beam spot 32 of laser beam 30 within groove 18. Controller 28 may be configured to regulate operations of fixture 22, laser 24, and material feeder 26.

Fixture 22 may be configured to receive component 10 and move component 10 relative to laser 24 and material feeder 26 during filling of groove 18. In the depicted example, fixture 22 is a spindle having a 3-way chuck configured to securely clamp component 10. The spindle may be connected to an electric motor (not shown) that is selectively activated by controller 28 to rotate component 10. As will be described in more detail below, component 10 may be rotated through at least two complete revolutions during filling of groove 18, including a deposition revolution during which both laser 24 and material feeder 26 are active, and at least one flattening revolution during which only laser 24 is active. The exemplary speed described above may result in a desired deposition amount, shape, and/or penetration depth of the abrasion-resistant cladding material into groove 18 and a desired final surface contour of the deposited material. It is contemplated, however, that other means of securing and/or moving component 10 may be utilized and/or that other movement parameters may be employed, if desired. It is further contemplated that instead of moving component 10 relative to laser 24 and material feeder 26, it may be possible to move laser 24 and material feeder 26 while maintaining component 10 stationary.

Figure 4:
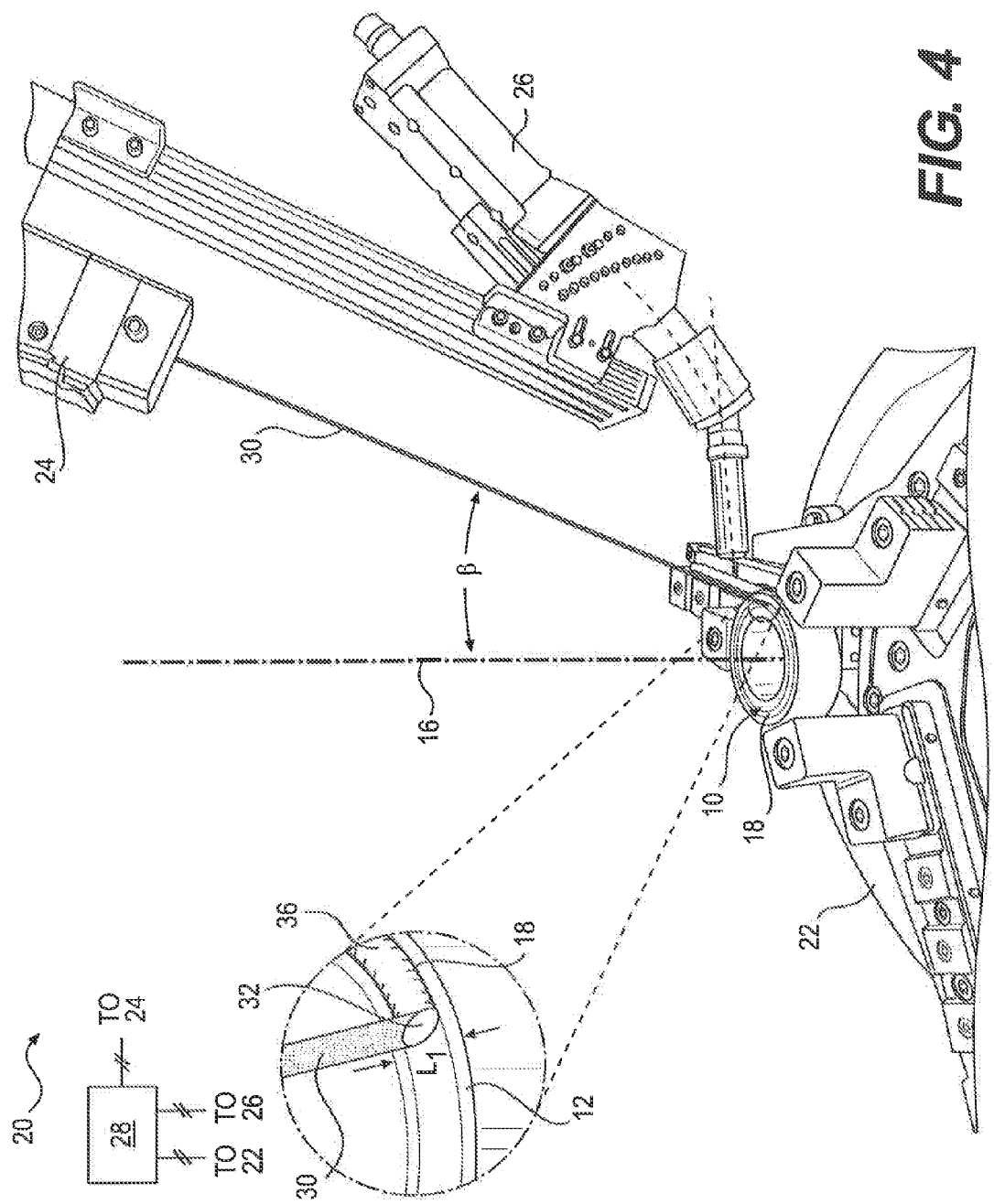

Laser 24 may be, for example, a high-energy $CO_2$ laser, ND:YAG laser, or other type of solid-state, fiber-delivered laser capable of melting the abrasion-resistant cladding material as it is fed into groove 18. In the disclosed embodiment, laser 24 is configured to produce a perpendicular beam spot 32 having a generally circular or square shape with a dimension (e.g., diameter) less than the width $w_1$ of groove 18. For example, laser 24 may produce a perpendicular beam spot 32 within groove 18 having a diameter that is about 80-90% of the width $w_1$ (e.g., beam spot 32 may have a diameter of about 7 mm). During the first rotation of component 10 described above (shown in FIG. 3), when material feeder 26 is actively depositing the abrasion-resistant cladding material into groove 18, laser 24 (i.e., an axis of laser beam 30 discharged by laser 24) may be oriented at an angle $\alpha$ relative to center axis 16 of component 10. In the disclosed embodiment, angle $\alpha$ may be about 0-12° at a side of center axis 16 opposite material feeder 26. However, during the second rotation of component 10 described above (shown in FIG. 4), when material feeder 26 is inactive, laser 24 may be oriented at an angle $\beta$ relative to center axis 16 of component 10. In the disclosed embodiment, angle $\beta$ may be about 20-30° at the same side of center axis 16 as material feeder 26. In other words, laser 24 may be moved through an angle of about 20-42° when transitioning from angle $\alpha$ to angle $\beta$ between the first and second rotations.

As laser 24 is tilted to a shallower angle relative to wear surface 12 of component 10 (e.g., from angle $\alpha$ to angle $\beta$), a characteristic (e.g., a shape, size, and/or power distribution) of beam spot 32 within groove 18 may change. That is, beam spot 32 may stretch in the direction of the tilt and become elliptically or rectangular shaped (see FIG. 5) and lower in power density. And when the tilt direction is aligned with a radial direction of component 10 (i.e., when the tilt direction passes through center axis 16 of component 10), the large dimension $L_1$ of the elliptical or rectangular shape will increase along with the tilt angle. In the disclosed embodiment, when laser 24 is tilted to angle $\beta$, the large dimension $L_1$ of beam spot 32 may be about equal to the width $w_1$ of groove 18 (e.g., about equal to 8 mm).

Material feeder 26 may be any conventional feeder capable of delivering a supply of the abrasion-resistant cladding material into groove 18 at a desired rate and angle. In the disclosed example, material feeder 26 may be configured to deliver the material in the form of a wire 34 (referring to FIG. 3). It is contemplated, however, that material feeder 26 may deliver the abrasion-resistant material into groove 18 in another form in a powder form), if desired. In some applications, material feeder 26 may additionally warm and/or engulf the material in a shield gas as it is delivered. The feed rate and/or angle of the delivered material may be regulated by controller 28. In the disclosed embodiment, the angle of delivery during the first rotation of component 10 may be about 50-55° relative to center axis 16 of component 10, and the feed rate may be sufficient to provide a volume of material about equal to or just more than (e.g., about 0-5% more than) a volume of groove 18 during only the first revolution of component 10.

Controller 28 may embody a single processor or multiple processors that include a means for controlling an operation of LCS 20. Numerous commercially available processors may perform the functions of controller 28. Controller 28 may include or be associated with a memory for storing data such as, for example, an operating condition, design limits, performance characteristics or specifications of laser 24 and material feeder 26, operational instructions, and corresponding quality parameters of component 10 (e.g., of wear surface 12). Various other known circuits may be associated with controller 28, including power supply circuitry, signal-conditioning circuitry, solenoid driver circuitry, communication circuitry, and other appropriate circuitry. Moreover, controller 28 may be capable of communicating with other components of LCS 20 (e.g., with motors, actuators, sensors, switches, etc. of laser 24 and/or material feeder 26) via either wired or wireless transmission.

Figure 5:
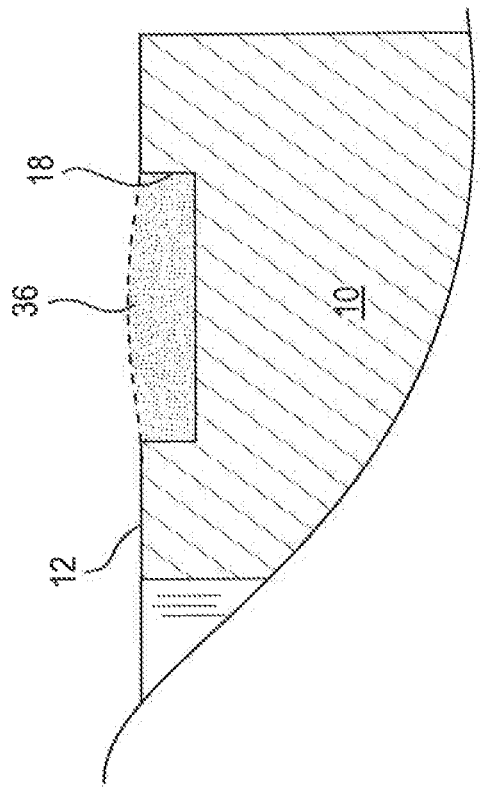
FIGS. 5 and 6 are cross-sectional illustrations of an exemplary portion of the grooved component of FIGS. 1 and 2.

As shown in FIG. 5, the abrasion-resistant cladding material deposited within groove 18 during the first revolution of component 10 may be simultaneously melted by laser beam 30 to form a bead 36 of molten metal (a cladding layer within groove 18). Bead 36 may be generally crowned, having a greater center depth and shallower lateral depths at opposing sides of groove 18. Bead 36 may have a generally rounded smooth outer contour, with the center thereof rising above wear surface 12. In contrast, the lateral edges of bead 36 may have a thickness $t_1$ less than height $h_1$ of groove 18. During deposition, the abrasion-resistant cladding material may penetrate into a bottom surface of groove 18 a distance $d_1$ about equal to or less than the height $h_1$ of groove 18, and create a boundary mixture of materials within this region.

Figure 6:
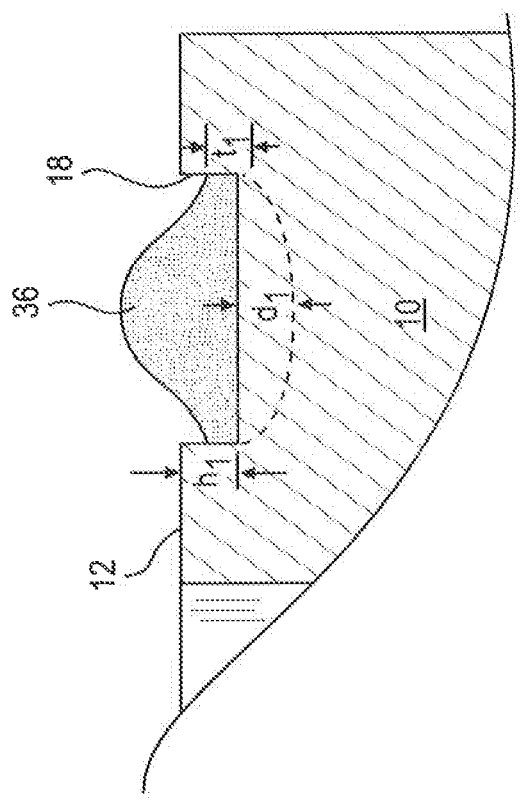

As shown in FIG. 6, bead 36 may be substantially flattened during the second revolution of component 10. That is, the use of laser 24 during the second revolution of component 10 (without additional material deposition), when beam spot 32 is elongated and has a lower power density, may soften or even melt the protruding portion of bead 36, thereby causing the protruding portion to flow toward and fill in the lateral edges of groove 18. In most applications, a portion of head 36 may still protrude beyond wear surface 12 at the end of the second revolution and require some machining (e.g., grinding) to make wear surface 12 completely planar again. However, this amount of machining may be relatively small.

Figure 7:
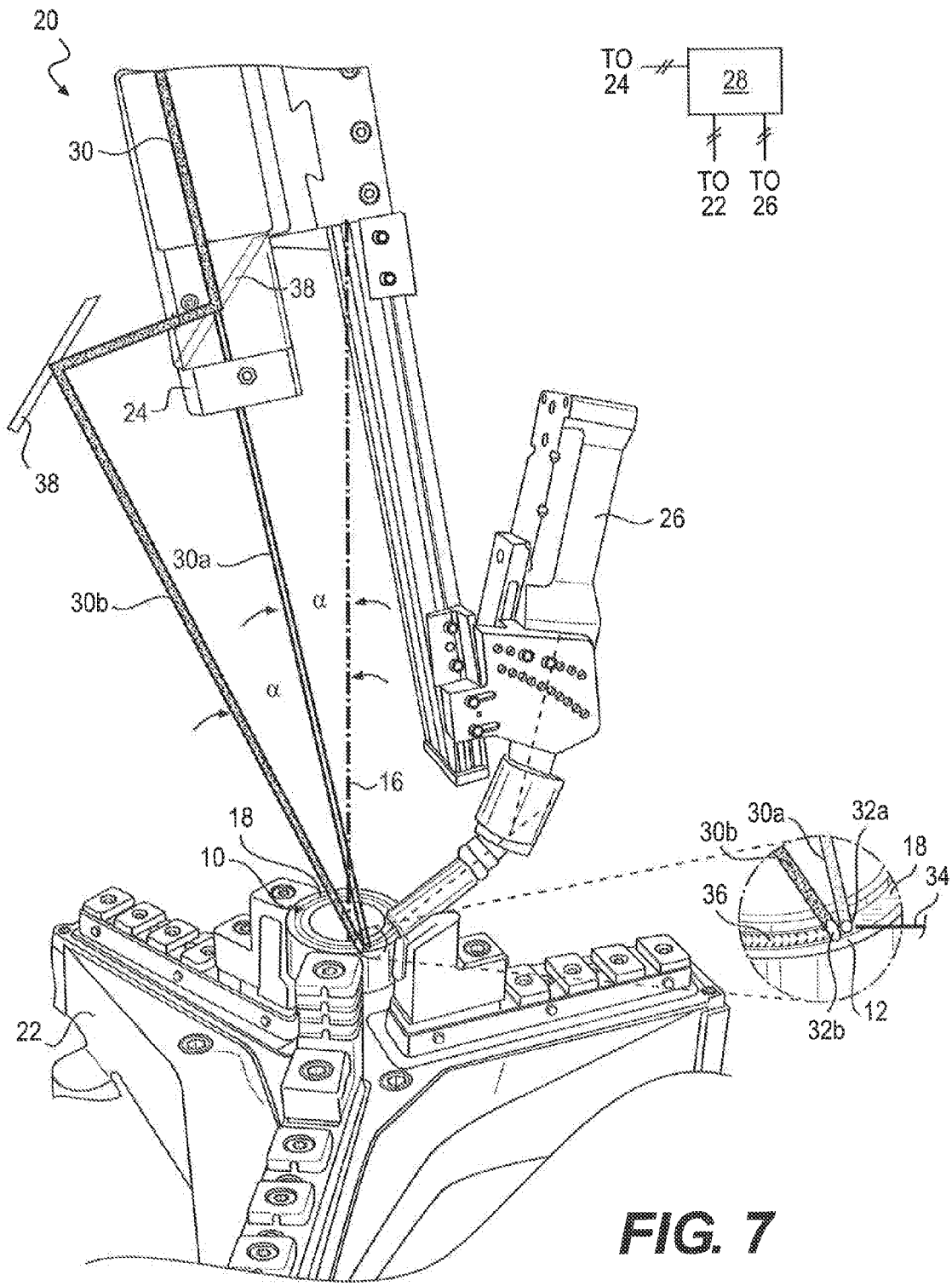
FIG. 7 is an isometric illustration of another exemplary disclosed fabrication system.

FIG. 7 illustrates an alternative embodiment of LCS 20. Similar to LCS 20 of FIG. 3, LCS 20 of FIG. 7 may include fixture 22 configured to hold component 10, laser 24, material feeder 26, and controller 28. However, in contrast to LCS 20 of FIG. 3, LCS 20 of FIG. 7 may be a fixed angle system and also include a way to split laser beam 30 into two different beams 30a, 30b. As part of the fixed angle system, laser 24 may be stationary and held at angle α throughout the entire fabrication process. And in order to still fill groove 18 with cladding material and flatten the material in substantially the same manner described above, laser 24 may equipped with mirrors 38 and/or other optical devices that split laser beam 30 into the two separate laser beams 30a and 30b.

In the disclosed embodiment, laser beam 30a may take the original path of laser beam 30 described above. However, laser beam 30b may take a path oriented at a different angle γ, for example at about 20-30° at the side of center axis 16 opposite material feeder 26. In addition, laser beam 30 may be split such that laser beam 30a has greater power compared to laser beam 30b (e.g., about four times the power of laser beam 30b). This may be accomplished by placing a semi-transparent mirror 38 in the direct path of laser beam 30 that would allow about 80% of the light of laser beam 30 to pass through it, while reflecting about 20% of the light. The 20% reflected light would then be directed against a second and fully reflective mirror that redirects the light through angle γ.

With the alternative configuration of LCS 20 shown in FIG. 7, it may be possible to fill groove 18 with a flattened bead of cladding material in a single pass. In particular, laser beam 30a may function in the same way described above with respect to laser beam 30. That is, as component 10 is rotated and cladding material 34 is directed into groove 18 by material feeder 26, laser beam 30a may generate a round or square beam spot 32a to melt the material and form the bead 36 of molten material. The angular orientation of laser beam 30b may then create an elliptical or rectangular beam spot 32b at a location just behind beam spot 32a (relative to a rotational direction of component 10) that can be used to flatten the bead 36 of molten material. In this manner, only a single revolution of component 10 may be required and LCS 20 may not need to be tilted between operations.

In yet another alternative embodiment (not shown), laser beam 30b may generated by another completely separate laser that is either joined with laser 24 or a standalone laser. The second laser could be different than laser 24 (e.g., have a different power output and/or produce laser beam 30b having a different shape). With this configuration, the use of mirror(s) 38 may be unnecessary.

INDUSTRIAL APPLICABILITY

The disclosed laser cladding fabrication system may be used to enhance the wear characteristics of a variety of different components. The disclosed laser cladding fabrication system finds particular use in improving and/or repurposing annular wear surfaces, such as those found in bushings, on rods, within pistons, and associated with other circular, cylindrical and/or spherical components. Operation of LCS 20 will now be described in detail.

The first step in enhancing wear surface 12 of component 10 may include formation of groove 18. Groove 18 may be formed by way of a milling and/or lathing process. Thereafter, component 10 may be loaded into fixture 22, and an indication of readiness to begin deposition may be provided to controller 28. This indication may be provided manually by an operator of LCS 20 and/or automatically based a detected condition of component 10 and/or fixture 22, as is known in the art.

Laser 24 may then be placed into its first position, laser 24 and material feeder 26 may be activated, and component 10 may be caused to move through its first (or only) rotation. In particular, laser 24 may be caused to automatically tilt to angle α by controller 28 (e.g., by activation of one or more motors or actuators associated therewith) or, alternatively, manually tilted to angle α by a service technician. Controller 28 may then selectively activate laser 24 to generate laser beam 30 and produce the generally cylindrical beam spot 32 within groove 18. At about this same time (or shortly thereafter), material feeder 26 may be caused by controller 28 to feed the abrasion resistant material into beam spot 32. Controller 28 may then activate the motor of fixture 22 to rotate component through about 360°. During this rotation, bead 36 may be continuously formed within groove 18 by melting the abrasion-resistant material with laser beam 30.

After component 10 has been moved through its first rotation and bead 36 has been formed within groove 19, laser 24 may be placed in its second position (i.e., automatically or manually tilted to angle β), material feeder 26 may be deactivated, and component 10 may be caused to move through its second rotation. Specifically, controller 28 may selectively activate (or maintain activation of) laser 24 to generate laser beam 30 and produce the generally elliptical or rectangular beam spot 32 across the entire width $w_1$ of groove 18. At about this same time (or shortly thereafter), controller may again activate the motor of fixture 22 to rotate component once again through about 360°. During this rotation, beam spot 32 may move over the cladding layer, causing bead 36 to soften and substantially flatten within groove 18. It is contemplated that component 10 may be rotated through more than one flattening rotation, if desired, and/or that the first and second rotations may be continuous (i.e., without a stop and start therebetween).

Because the disclosed system may be capable of using a laser 24 having a beam spot 32 normally smaller than groove 18 to completely fill groove 18, a greater size range of grooves 18 may be filled with a single laser 24. For example, it may be possible to fill an 8 mm wide groove 18, a 9 mm wide groove 18, a 10 mm wide groove 18, and/or an even wider groove 18 with a laser 24, which produces only a 7 mm perpendicular beam spot 32, simply by tilting laser 24 to a shallower angle (or using optics to tilt the beam). This could reduce tooling costs associated with the disclosed wear-enhancing process, by enhancing application of LCS 20.

In addition, because the disclosed system may be capable of substantially flattening bead 36 during the second rotation (or simultaneous with the first rotation—embodiment of FIG. 7), less material may be required to completely fill groove 18. This reduction in material may reduce a cost of component 10, while also reducing an amount of post-machining required to prepare wear surface 12. The reduced post-machining may reduce a fabrication time of component 10 and/or deterioration of the corresponding machining tools.

It will be apparent to those skilled in the art that various modifications and variations can be made to the disclosed system and method without departing from the scope of the disclosure. Other embodiments of the method will be apparent to those skilled in the art from consideration of the specification and practice of the system and method disclosed herein. It is intended that the specification and examples be considered as exemplary only, with a true scope of the disclosure being indicated by the following claims and their equivalents.

What is claimed is:

1. A method of fabricating a component, comprising:
    generating a first laser beam at a first orientation relative to a groove formed in a wear surface of the component to produce a first laser beam spot having a first characteristic with a first dimension less than a width of the groove;
    feeding a cladding material into the first laser beam spot while the first laser beam is being generated to produce a cladding layer on the wear surface;
    generating a second laser beam at a second orientation relative to the wear surface of the component to produce a second laser beam spot having a second characteristic with a second dimension about equal to the width of the groove; and
    moving the second laser beam spot along the cladding layer to substantially flatten the cladding layer.

2. The method of claim 1, wherein the first and second orientations are angles of a laser beam produced by a laser relative to a center axis of the component.

3. The method of claim 2, wherein the first and second orientations are produced by changing a physical orientation of the laser.

4. The method of claim 2, wherein the first and second orientations are produced by directing the laser beam through optics that split and redirection portions of the laser beam.

5. The method of claim 2, wherein:
    the first orientation is an angle of about 0-12°; and
    the second orientation is angle of about 20-30°.

6. The method of claim 1, wherein:
    the first characteristic is a generally circular or square shape; and
    the second characteristic is a generally elliptical or rectangular shape.

7. The method of claim 1, wherein the first and second characteristics include shapes and sizes.

8. The method of claim 7, wherein:
    the first characteristic is a generally circular or square shape having the first dimension; and
    the second characteristic is a generally elliptical or rectangular shape having the second dimension.

9. The method of claim 1, wherein the first dimension is about 80-90% of the width of the groove.

10. The method of claim 1, wherein:
    the groove has a depth about 10-15% of the width; and
    the cladding layer penetrates into a bottom surface of the groove an amount about equal to the depth.

11. The method of claim 1, wherein the first laser beam spot is generated at a first power density and the second laser beam spot is generated at a second power density.

12. The method of claim 10, wherein:
    a laser is maintained stationary; and
    moving the second laser beam spot includes rotating the component relative to the laser.

13. The method of claim 1, wherein the cladding material is in wire form.

14. A method of fabricating a bushing, comprising:
    generating a first laser beam at a first angle relative to an end surface of the bushing to produce a first laser beam spot having a generally circular or square shape;
    feeding a cladding material into the first laser beam spot while the first laser beam is being generated to produce a cladding layer within a circumferential groove in the end surface, the circumferential groove having a width greater than a first dimension of the first laser beam spot;
    generating a second laser beam at a shallower second angle relative to the end surface of the bushing to produce a second laser beam spot having a generally elliptical or rectangular shape and a second dimension about equal to the width of the circumferential groove; and
    moving the second laser beam spot along the cladding layer to substantially flatten the cladding layer within the circumferential groove.

15. A laser cladding system, comprising:
    a fixture configured to hold a component;
    a material feeder configured to direct a cladding material toward a groove formed in a wear surface of the component when the component is held in the fixture;
    a laser configured to direct a laser beam onto the wear surface of the component when the component is held in the fixture; and
    a controller in communication with the laser and the material feeder, the controller being configured to:
        generate a first laser beam at a first orientation to produce a first laser beam spot having a first characteristic with a first dimension less than a width of the groove;
        cause the material feeder to direct the cladding material into the first laser beam spot while the first laser beam is being generated to produce a cladding layer on the wear surface;
        generate a second laser beam at a second orientation to produce a second laser beam spot having a second characteristic with a second dimension about equal to the width of the groove; and
        move the second laser beam spot along the cladding layer to substantially flatten the cladding layer.

16. The laser cladding system of claim 15, wherein:
    the first characteristic is a generally circular or square shape; and
    the second characteristic is a generally elliptical or rectangular shape.

17. The laser cladding system of claim 15, wherein:
    the laser is maintained stationary; and
    the controller is configured to cause the fixture to rotate the component relative to the laser.

\* \* \* \* \*